July 22, 1969     S. SAPIR     3,456,455
TEMPERATURE CONTROLLER FOR ENVIRONMENTAL CHAMBER
Filed Sept. 22, 1967     2 Sheets-Sheet 1
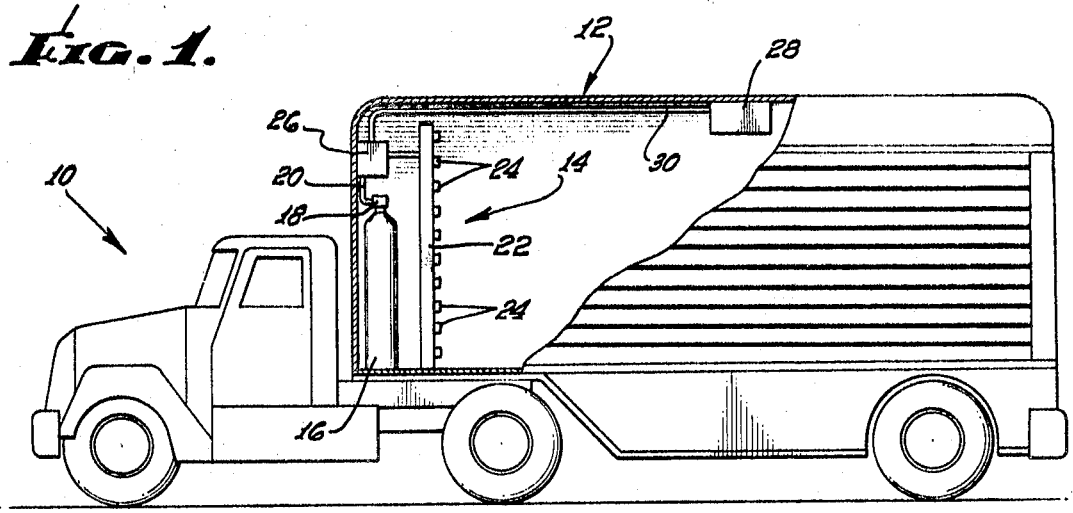
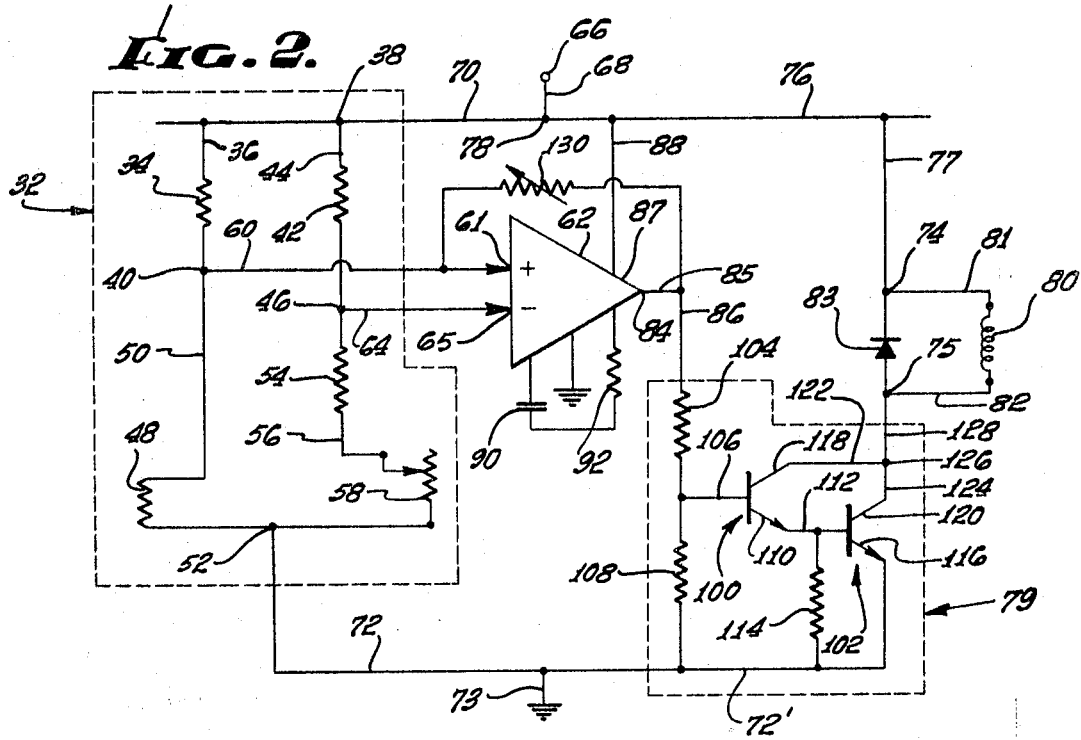
INVENTOR.
SAID SAPIR
BY
ATTORNEY.

July 22, 1969        S. SAPIR        3,456,455

TEMPERATURE CONTROLLER FOR ENVIRONMENTAL CHAMBER

Filed Sept. 22, 1967        2 Sheets-Sheet 2

INVENTOR.
SAID SAPIR
BY
ATTORNEY.

United States Patent Office 3,456,455
Patented July 22, 1969

3,456,455
TEMPERATURE CONTROLLER FOR ENVIRONMENTAL CHAMBER
Said Sapir, Burbank, Calif., assignor to International Telephone and Telegraph Corporation, New York, N.Y., a corporation of Delaware
Filed Sept. 22, 1967, Ser. No. 669,768
Int. Cl. F25b *41/04;* G05d *15/01*
U.S. Cl. 62—223      4 Claims

ABSTRACT OF THE DISCLOSURE

A temperature controller for environmental chambers such as a truck trailer which carries produce. A refrigeration system in the trailer employing direct release of liquefied gas into the chamber as the cooling means is energized by the temperature controller when the temperature in the trailer rises to a predetermined value slightly above freezing. The controller de-energizes the refrigeration system when the temperature within the trailer drops below said predetermined value.

BACKGROUND OF THE INVENTION

This invention relates to a temperature controller and, more particularly, to a temperature controller for refrigerated chambers.

It is a common practice to store or ship produce, namely fruits and vegetables, in refrigerated chambers. It is desirable that the temperature within the chambers be maintained within narrow limits, the preferred upper limit being one or two degrees above freezing to preserve the produce and the lower limit being just above freezing since freezing temperatures completely destroy produce.

Some refrigerated chambers utilize liquefied gas, such as liquid nitrogen, for the refrigeration medium which is sprayed into the chamber to cool the produce. However, sprayed liquid nitrogen reduces the temperature of a chamber extremely rapidly, thus with conventional temperature control systems sometimes dropping the temperature in the chamber to freezing and damaging the produce therein. Consequently, with this type of refrigeration a particularly sensitive and precise control system is required for controlling the amount of liquid nitrogen sprayed into the chamber, so that the temperature within the chamber may be maintained within the narrow limits mentioned above.

SUMMARY OF THE INVENTION

It is, therefore, the principal object of the present invention to provide a controller for an environmental chamber which is capable of precisely controlling the temperature within the chamber.

Another object of the invention is to provide a temperature controller which is capable of opening and closing an output valve of a container of liquefied gas in response to an extremely small input signal provided by a temperature probe.

A further object of the invention is to provide a temperature controller of the character described which embodies "fail-safe" circuit means that secures the outlet valve of the liquefied gas container in its closed position in the event the temperature probe is broken, thereby preventing accidental freezing of the contents of the environmental chamber.

According to the principal aspect of the present invention, there is provided a temperature controller for an environmental chamber which is desired to be maintained within a critical temperature range. The temperature controller comprises a resistor bridge circuit having a temperature sensitive resistor in one leg thereof. An amplifier is provided which is responsive to an unbalance of the bridge caused by a resistance change in the temperature sensitive resistor. The output of the amplifier controls switch means which actuates the control valve for the container of liquefied gas, opening the valve in response to a rise in temperature to a predetermined value so that the gas is sprayed into the chamber to lower the temperature therein, and closing the valve when the spray has reduced the temperature within the chamber to below said predetermined value. The amplifier is provided with a feedback circuit to enable the temperature controller to function in response to very small input signals so that precise control of the temperature within the chamber may be maintained.

Other objects, aspects and advantages of the invention will become apparent from the following description taken in connection with the accompanying drawings wherein:

BRIEF DESCRIPTION OF THE DRAWINGS

FIGURE 1 is a side elevational view of a truck and trailer, a side panel of the trailer being partly broken away to show the refrigeration system therefor, which is illustrated schematically;

FIGURE 2 is a circuit diagram of one form of the temperature controller for the refrigeration system illustrated in FIGURE 1.

DETAILED DESCRIPTION

Figure 3:
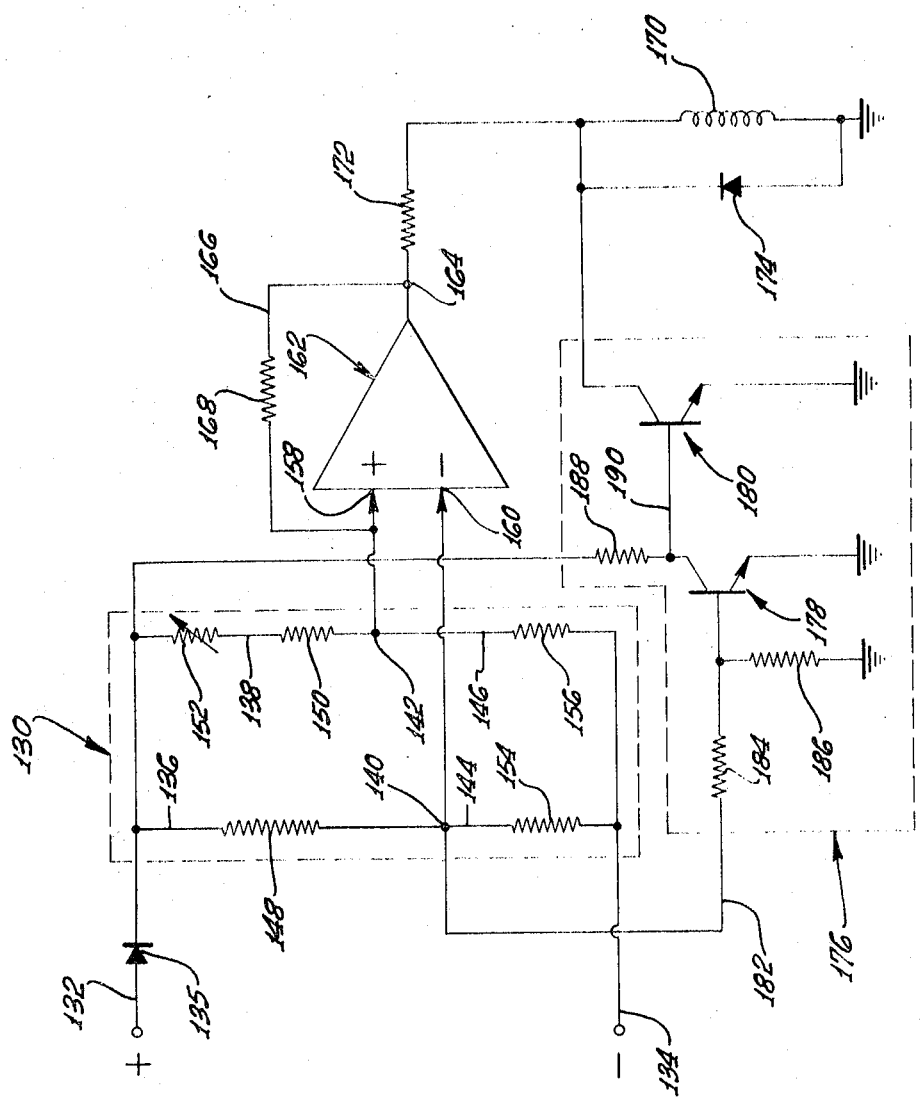
FIGURE 3 is a circuit diagram of another form of the temperature controller for the refrigeration system illustrated in FIGURE 1.

Referring now to FIGURE 1 in detail, there is shown a truck 10 and trailer 12 for transporting products such as produce, and a refrigeration system, generally designated 14, for controlling the environmental temperature within the trailer.

The refrigeration system 14 includes one or more bottles 16 of a liquefied gas, such as liquid nitrogen. The outlet 18 of the bottle 16 is connected by a conduit 20 to a header 22 having a plurality of spray nozzles 24. A solenoid operated control valve 26 is connected in the conduit 20 for controlling the supply of liquid nitrogen from the bottle 16 to the nozzles 24. When the valve 26 is opened, liquid nitrogen is supplied in the form of a spray to the trailer 12 to cool the inside thereof.

A temperature controller, generally designated by numeral 28, is mounted against the ceiling of the trailer 12. The output line 30 of the temperature controller is connected to the control valve 26.

The general operation of the system is as follows: When the temperature within the trailer 12 rises to a predetermined value, for example, one or two degrees above freezing in the case where produce is being transported in the trailer 12, the temperature controller 28 functions to open the valve 26 so that liquid nitrogen is sprayed into the trailer 12 through the nozzles 24. When the spray causes the temperature within the trailer 12 to drop below said predetermined value, the controller 28 functions to close the valve 26.

One embodiment of the controller 28 of the invention for the refrigeration system 14 is illustrated in detail in FIGURE 2. The controller includes a resistor bridge circuit generally designated by numeral 32. A resistor 34 is connected in the leg 36 of the bridge circuit between the terminals 38 and 40. A resistor 42 is connected in the leg 44 between the terminal 38 and terminal 46. A temperature sensitive resistor 48 is connected in the leg 50 of the bridge between the terminal 40 and terminal 52. The resistor 48 constitutes the temperature probe of the controller 28 and may be located in any desired position within the trailer 12, preferably a position which is remote from the nozzles 24. A fourth resistor 54 is connected in series with a variable resistor 58 in the leg 56 of the bridge between the terminals 46 and 52. Variable resistor 58 permits adjustment of the bridge circuit to the desired condition of balance.

The terminal 40 of the bridge is connected by a conductor 60 to the positive terminal 61 of a conventional operational amplifier 62, while the terminal 46 of the bridge is connected by a conductor 64 to the negative terminal 65 of the amplifier 62.

A voltage is applied across terminals 38 and 52 of the bridge circuit 32 by connecting a voltage source, not shown, to a terminal 66 connected by conductors 68 and 70 to bridge terminal 38, and by connecting the bridge terminal 52 by a conductor 72 to ground 73.

The voltage source is also applied across terminals 74 and 75 of the control circuit by conductors 76 and 77 between junction 78 and terminal 74 and by connecting terminal 75 through a switching circuit generally designated 79, to ground 73. A coil 80 of the solenoid operated valve 26 is connected to junctions 74 and 75 by conductors 81 and 82, respectively. Preferably, a diode 83 is connected in parallel to the coil 80 by being connected to terminals 74 and 75. The diode functions to dissipate the energy in the coil 80 after de-energization thereof.

One output terminal 84 of the amplifier 62 is connected to the switching circuit 79 by conductors 85 and 86. The other output terminal 87 of the amplifier 62 is connected by a conductor 88 to conductor 76. A capacitor 90 and resistor 92 are connected in a conventional manner to amplifier 62 to provide dynamic stability.

The switching circuit 79 comprises two transistors generally designated 100 and 102. The conductor 86 connects through a resistor 104 to the base 106 of the transistor 100. A resistor 108 is connected between the base 106 and ground 73 through the conductor 72'. The emitter 110 of the transistor 100 is connected to the base 112 of the second transistor 102. A resistor 114 connects the base 112 to the conductor 72' which is in turn connected to the emitter 116 of the transistor 102. The collectors 118 and 120 of the transistors 100 and 102, respectively, are connected by conductors 122 and 124 to a junction 126. The junction 126 is connected by conductor 128 to the terminal 75.

The transistor 100 together with the resistors 104, 108 and 114 serve as an amplifier for the output of the operational amplifier 62. The transistor 102 operates as an electronic switch, which is normally open. Consequently the coil 80 is normally de-energized.

The solenoid operated valve 26 is arranged to be closed when the coil 80 is de-energized. When an output signal from the amplifier 62 is delivered to the switching circuit 79, the circuit in effect closes, thus permitting current to flow from the potential input terminal 66, through coil 80 to ground 73, thereby energizing the coil 80 and opening valve 26.

As explained previously, an object of the invention is to maintain the temperature within the trailer 12 within very precise limits. Normally, because of the rapid cooling action of the liquefied gas when released, the output signal of the bridge circuit 32, even when amplified by operational amplifier 62, would not be sufficiently responsive to temperature changes to permit the temperature to be held only a degree or two above freezing without danger of the temperature inadvertently dropping to the freezing point. Therefore, in the preferred embodiment of the invention there is provided a positive or regenerative feedback circuit for the amplifier 62 through a resistor 130 connected between the output terminal 84 and positive input terminal 61 of the amplifier 62. The regeneration by this feedback circuit makes it possible to operate the switching circuit 79 and thus the coil 80 of the solenoid when the amplifier input signal from the probe resistor 48 is only a very small fraction of a volt. The resistor 130 in the feedback loop may be adjustable if desired to allow control of the amount of the feedback.

The operation of the form of controller 28 illustrated in FIGURE 2 is as follows: When the temperature within the trailer 12 rises to a predetermined value, as determined by the setting of the variable resistor 58, the balance of bridge circuit 32 changes thereby delivering a signal to the input termnals of operational amplifier 62. Such signal is amplified by the amplifier 62, and is further amplified to the required extent by regeneration from the feedback circuit provided through the resistor 130 and by the transistor 100. The amplified signal causes conduction through transistor 102, closing the circuit between the input voltage terminal 66 and the ground connection 73 through the solenoid coil 80. The solenoid valve 26 is hence opened, thus causing the liquid nitrogen to be sprayed into the trailer 12 until the temperature within the trailer drops below the said predetermined value, at which time the balance of bridge circuit 32 will be returned to its initial condition and the solenoid coil 80 is de-energized to again close valve 26.

Due to the feedback circuit 130 for the operational amplifier 62 and the transistorized amplifier and switching circuit 79, it is possible to control the temperature within the trailer 12 within extremely narrow limits, thus making it possible to retain produce within the trailer at a sufficiently low temperature to prevent it from spoiling yet not so low as to cause it to freeze which would permanently damage the produce.

The following table lists circuit components and values thereof for a test circuit which was established in accordance with FIGURE 2. This table is given by way of example only and not by way of limitation.

Voltage applied to terminal 66 -- +12 volts +3, −4.
Resistor 34 ------------------- 2K ohms.
Resistor 42 ------------------- 2K ohms.
Temperature sensitive
  resistor 48 ----------------- 2000 ohms at 32° F.
Resistor 54 ------------------- 1620 ohms.
Variable resistor ------------- 1000 ohm potentiometer.
Operational amplifier 62 ------ MC 1433.
Diode 83 --------------------- Diodes Inc. TS05.
Capacitor 90 ----------------- .01 mfd-WMFISI C.D.
Resistor 92 ------------------- 10 ohms.
Transistor 100 --------------- RCA 40514.
Transistor 102 --------------- Fairchild 2N3567.
Resistor 104 ------ --------- 3.3K ohms.
Resistor 108 ----------------- 2K ohms.
Resistor 114 ----------------- 510 ohms.
Variable resistor 130 --------- 1M ohm.

Referring now to FIGURE 3 of the drawings, the form of temperature controller 28 which is there illustrated differs in several respects from the form of controller 28 illustrated in FIGURE 2, although retaining the high degree of sensitivity thereof. The principal difference is the inclusion in the form of FIGURE 3 of "fail-safe" circuit means to protect against accidental opening of the outlet valve of the liquefied gas container if the temperature probe should become broken. Another difference is the use of a sensitive relay as the switch means for operating the solenoid valve in place of the switching circuit 79.

The controller of FIGURE 3 includes resistor bridge circuit 130 connected between positive and negative input conductors 132 and 134, respectively, the negative conductor 134 being grounded. Preferably a diode 135 is disposed in the input conductor 132 to prevent damage to circuit components in the event the input conductors are accidentally connected to the wrong terminals of the power source.

Bridge circuit 130 includes legs 136 and 138 which extend from positive input conductor 132 to respective bridge terminals 140 and 142, and legs 144 and 146 which extend from negative input conductor 134 to the respective bridge terminals 140 and 142. Bridge leg 136 includes the temperature sensitive resistor 148 which constitutes the temperature probe of the system. Bridge leg 138 includes, in series, a fixed resistor 150 and a variable resistor 152, the latter permitting adjustment of the bridge circuit. Bridge legs 144 and 146 include respective resistors 154 and 156.

The terminals 142 and 140 of the bridge circuit 130 are connected to the respective positive and negative input terminals 158 and 160 of conventional operational amplifier 162. The output terminal 164 of the operational amplifier is coupled back to the positive input terminal 158 by means of regenerative feedback loop 166 having a resistor 168 therein.

The coil 170 of a sensitive relay is connected between the operational amplifier output terminal 164 and ground, and this sensitive relay is operatively connected to the solenoid valve 26 so that energization of the relay coil 170 will in turn cause energization and hence opening of solenoid valve 26. The operational amplifier is protected from inductive current surges from relay coil 170 by a resistor 172 between the operational amplifier and coil 170, and by a diode 174 connected across the relay coil 170.

During normal operation of the controller of FIGURE 3, when the temperature within the trailer 12 rises to a predetermined value, as determined by the setting of the variable resistor 152, the balance of bridge circuit 130 changes so as to deliver a signal to the input terminals 158 and 160 of the operational amplifier. This signal is amplified by the operational amplifier, and is further amplified by regeneration from the feedback loop 166. The amplified signal is applied across the coil 170 of the sensitive relay, causing the relay to close and thereby actuating the solenoid valve 26 to open the latter and thus cause liquid nitrogen to be sprayed into the trailer 12 until the temperature within the trailer drops below the said predetermined value, at which time the balance of bridge circuit 130 is returned to its initial condition and the relay coil 170 becomes de-energized so as to open the relay and consequently close the solenoid valve 26.

If the temperature probe were to become broken so as to produce a break in the continuity of the temperature sensitive resistor 148, this drastic increase in the resistance of bridge leg 136 would appear the same to the operational amplifier as a sudden and very large increase in the temperature sensed by the probe. Such a broken probe would therefore, in the absence of protective means, cause the solenoid valve 26 to be opened and to remain open, quickly freezing the contents of the environmental chamber. Protective means for avoiding such a damaging occurrence is embodied in the controller of FIGURE 3 in the form of relay shunt circuit generally designated 176. In the undamaged condition of the controller this shunt circuit is ineffective in that it does not interfere with the normal operation of the controller to actuate the solenoid valve 26 through the closing and opening of the relay embodying the coil 170. However, in the event that the probe leg 136 of the bridge becomes open, as by the probe being broken, then the shunt circuit 176 instantaneously establishes a low resistance shunt path across the coil 170 to prevent energization of the coil 170 and to thereby prevent the accidental opening of the solenoid valve 26.

The relay shunt circuit 176 includes a pair of transistors 178 and 180, the transistor 178 functioning as a control element and the transistor 180 functioning as the shunting element. The input to shunt circuit 176 is provided by a conductor 182 extending from the bridge terminal 140 to the base of transistor 178, conductor 182 having a resistor 184 therein. A resistor 186 is connected between the base of transistor 178 and ground. The emitter of transistor 178 is grounded, while the collector thereof is connected through a load resistor 188 to the positive conductor 132.

The input to transistor 180 is a conductor 190 which connects the collector of transistor 178 to the base of transistor 180. The relay shunt circuit is completed by connection of the emitter of transistor 180 to ground and the collector of transistor 180 to the input or positive side of relay coil 170.

When the probe resistor 148 is intact, the bridge network biases the control transistor 178 to a conducting condition. This in turn will result in a biasing of the transistor 180 to cutoff, so that the emitter-collector circuit of transistor 180 is a substantially open circuit which does not interfere with normal operation of the relay coil 170. During normal operation of the controller the electrical potential at bridge junction 140 will vary within a normal range. The forward biasing of transistor 178 is sufficiently large so that these normal variations do not materially change the conducting condition of transistor 178 and hence the substantially open-circuit condition of transistor 180.

However, if the probe resistor 148 should become broken, current will immediately cease to flow through the legs 136 and 144 of the bridge circuit, so that the bridge junction 140 will be reduced to substantially ground potential through bridge leg 144. This will instantaneously bias transistor 178 to cutoff, thereby applying a large forward bias to transistor 180 through resistor 188 and conductor 190, thereby causing the emitter-collector circuit of transistor 180 to provide a low-resistance shunt across relay coil 170, holding the solenoid valve 26 in the closed position.

The following table lists circuit components and values thereof for a test circuit which was established in accordance with FIGURE 3, this table being given by way of example only and not by way of limitation.

| | |
|---|---|
| Voltage applied to conductor 132 | Approx. +12 volts. |
| Temperature sensitive resistor 148 | 2000 ohms at 32° F. |
| Resistor 150 | 1620 ohms. |
| Variable resistor 152 | 1000 ohm potentiometer. |
| Resistor 154 | 2K ohms. |
| Resistor 156 | 2K ohms. |
| Operational amplifier 62 | MC 1433. |
| Resistor 168 | 1M ohm. |
| Relay coil 170 | 1 milliamp relay with 10K ohm resistance in coil winding. |
| Resistor 172 | 1.2K ohms. |
| Diode 174 | Diodes Inc. TS05. |
| Transistor 178 | 2N3392. |
| Transistor 180 | 2N3392. |
| Resistor 184 | 360K ohm. |
| Resistor 186 | 240K ohm. |
| Resistor 188 | 100K ohm. |

Although the circuits illustrated in FIGURES 2 and 3 employ transistors which are of the NPN type it is to be understood that PNP type transistors may be employed by reversing the circuit polarities to conform to the PNP transistor polarities.

While several embodiments of the controller 28 have been described herein in connection with a refrigeration system, it will be appreciated that the controller may be utilized in other environmental chambers wherein it is required to precisely maintain temperatures within narrow limits.

Although I have herein shown and described my invention is what I have conceived to be the most practical and preferred embodiments, it is recognized that departures may be made therefrom within the scope of my invention, which is not to be limited to the details disclosed herein but is to be accorded the full scope of the claims so as to embrace any and all equivalent structures and systems.

What is claimed is:

1. A temperature controller for an environmental chamber comprising: sensor means to produce a first output signal in acordance with the temperature inside the chamber; means including an amplifier having positive feedback for producing a step function second output signal increasing at a rate with respect to time much larger than the rate of change of said first output signal with respect to time when said first signal exceeds a predetermined magnitude; source means actuable to change the temperature of said chamber; and circuit means responsive to said second signal for actuating said source means.

2. The invention as defined in claim 1, wherein said sensor means includes a DC thermistor bridge constructed to cause said first output signal to change in polarity when the temperature in said chamber decreases past a predetermined cold magnitude, said amplifier producing the step in said second output signal when said first signal changes polarity, said source means including a liquified gas reservoir, and a solenoid valve and a spray nozzle connected from said reservoir to spray said liquified gas inside said chamber, said circuit means being adapted to de-energize said solenoid valve when the step is produced in said second output signal to stop the escape of said liquified gas at said nozzle.

3. The invention as defined in claim 1, wherein said source means includes a liquified gas reservoir, and a solenoid valve and a spray nozzle connected from said reservoir to spray said liquified gas inside said chamber, said circuit means being adapted to de-energize said solenoid valve when the step is produced in said second output signal, said amplifier being adapted to produce said step when the temperature of said chamber decreases past a predetermined cold magnitude.

4. A temperature controller for an environmental chamber comprising: a resistor bridge having a temperature-sensitive resistor in one leg thereof; an amplifier responsive to a change in the condition of balance of said bridge caused by a change in temperature of said resistor; a circuit for said amplifier to supply positive feedback thereto; utilization means actuable to change the temperature of the chamber; switch means responsive to the output of said amplifier to actuate said utilization means; fail-safe circuit means operatively connected between said bridge and said switch means, said circuit means being substantially non-responsive to normal resistance changes in said temperature sensitive resistor during the operation of said controller for controlling the temperature in said environmental chamber, but said circuit means being responsive to an abnormally large resistance increase in said temperature-sensitive resistor to disable said switch means from actuating said utilization means in response to such abnormally large resistance increase.

References Cited

UNITED STATES PATENTS 3,005,135 10/1961 Palmer _____ 236—78
3,114,025 12/1963 Blauvelt.
3,293,877 12/1966 Barnes _____ 62—514

MEYER PERLIN, Primary Examiner

U.S. Cl. X.R.

62—514; 236—78